US 7,539,857 B2

(12) United States Patent
Bartlett et al.

(10) Patent No.: US 7,539,857 B2
(45) Date of Patent: May 26, 2009

(54) COOPERATIVE PROCESSING AND ESCALATION IN A MULTI-NODE APPLICATION-LAYER SECURITY SYSTEM AND METHOD

(75) Inventors: Jeannine A. Bartlett, Boston, MA (US); Yigal Rozenberg, Rehovot (IL)

(73) Assignee: Protegrity USA, Inc., Stamford, CT (US)

( * ) Notice: Subject to any disclaimer, the term of this patent is extended or adjusted under 35 U.S.C. 154(b) by 348 days.

(21) Appl. No.: 11/252,303

(22) Filed: Oct. 17, 2005

(65) Prior Publication Data

US 2006/0179296 A1 Aug. 10, 2006

Related U.S. Application Data

(60) Provisional application No. 60/618,599, filed on Oct. 15, 2004.

(51) Int. Cl.
*H04L 9/00* (2006.01)
*G06F 7/04* (2006.01)
*H04L 9/32* (2006.01)

(52) U.S. Cl. .................. 713/152; 713/153; 713/154; 726/3; 726/4; 726/5; 726/6; 726/7; 709/224; 709/225; 709/226; 709/227; 709/228

(58) Field of Classification Search .................. 713/152
See application file for complete search history.

(56) References Cited

U.S. PATENT DOCUMENTS 5,748,884 A 5/1998 Royce et al.
5,987,611 A * 11/1999 Freund ........................... 726/4
6,226,372 B1 * 5/2001 Beebe et al. ................. 379/189
6,513,060 B1 1/2003 Nixon et al.
6,647,400 B1 11/2003 Moran
6,754,664 B1 6/2004 Bush
6,766,368 B1 7/2004 Jakobson et al.
2001/0052014 A1 12/2001 Sheymov et al.
2002/0119427 A1 * 8/2002 Brown et al. ................... 434/1
2004/0139448 A1 7/2004 Hope et al.
2005/0050377 A1 * 3/2005 Chan et al. ..................... 714/4
2005/0081045 A1 * 4/2005 Nicodemus et al. ......... 713/182

OTHER PUBLICATIONS

International Search Report and Written Opinion from Application No. PCT/US05/37251 mailed on Mar. 26, 2008.

* cited by examiner

*Primary Examiner*—Longbit Chai
(74) *Attorney, Agent, or Firm*—Todd M. Schneider; Paul, Hastings, Janofsky & Walker LLP

(57) ABSTRACT

A cooperative processing and escalation method and system for use in multi-node application-layer security management is disclosed. The method includes the steps of identifying individual application security nodes, grouping and configuring nodes for cooperative processing, assigning the default operational mode at each node, assignment of logging and alert event tasks at each node, and defining escalation and de-escalation rules and triggers at each node. Both loosely-coupled and tightly-coupled configurations, each with its cooperative processing model, are disclosed. The method includes provision for central console configuration and control, near real-time central console dashboard operations interface, alert notification, and operator override of operational modes and event tasks.

35 Claims, 13 Drawing Sheets

COOPERATIVE PROCESSING AND ESCALATION IN A MULTI-NODE APPLICATION-LAYER SECURITY SYSTEM AND METHOD

FIELD OF INVENTION

The present invention relates generally to the field of application-layer security systems, and more particularly, to a system and method for achieving cooperative processing and control of application-layer security by using loosely and tightly coupled nodes of application firewalls, application monitors and data security enforcement points together with operational and escalation rules.

DESCRIPTION OF RELATED ART

As business and government applications are made available to intended users via intranets, extranets and the Internet, exposure to hackers has become a critical problem in the Information Technology ("IT") Operations field. Systems that provide security at lower layers of the networked environment in the open systems interconnection ("OSI") model provide little or no defense from hackers gaining unauthorized access to assets, information and sensitive data using application-layer protocols. FIG. 1 illustrates an OSI model 100 that defines a networking framework for implementing protocols in seven layers. The application-layer 110 of the OSI model includes the entire logical application, including n-tier applications installed on multiple servers, dedicated to specific functions for application processing and data access. Typical attacks by economically or politically motivated "hackers" target unique application protocol and interface vulnerabilities, repeatedly probing the targeted site using various techniques until entry is gained. Other "malicious users," even those with legitimate access rights such as employees, might steal sensitive data in large batches or in small, repetitive batches in an effort to avoid detection. Both hackers and malicious users are highly motivated to target an entire distributed corporate application environment, both to avoid detection and to gain maximum access for current or future misuse. These attack profiles differ from attacks targeted at lower OSI layers (e.g., worms), as the probes and behavior are masqueraded as legitimate traffic and requests, and are not identifiable as malicious by using traditional network-based intrusion detection or intrusion prevention methods below the application-layer 110.

Application firewalls have been developed to address hacking techniques specific to hypertext transfer protocols ("HTTP" and "HTTPS") and other protocols which use HTTP and/or HTTPS as an application-layer traffic transport mechanism (e.g., Hypertext Markup Language (HTML), Simple Object Access Protocol (SOAP), Web Services, Extensible Markup Language (XML), Web-based Distributed Authoring and Versioning (WebDAV), Lightweight Directory Access Protocol (LDAP), Active Directory, etc.). Application firewalls intercept and examine traffic content, coded instructions and protocols for potential malicious behavior and signatures, log event activity, alert IT Operations and optionally block or alter malicious traffic before it can reach downstream Web, application and database servers. Non-malicious traffic is forwarded without being blocked.

Current application firewalls, whether they are implemented as separate reverse-proxy server machines, co-located with the application on the same host machine, or co-located with network firewall machines, generally operate in real-time, intrusively in-line with the applications they protect. This introduces latency while the application firewall examines the traffic, logs the activity, alerts IT Operations and/or network firewalls to suspected attacks and passes traffic on to the application. Additional latency is introduced when HTTPS traffic is examined. For instance, secure socket layer ("SSL") protocols used in HTTPS are terminated and decrypted prior to examination; in some implementations, traffic is additionally encrypted again before passing traffic on to the Web, application, and/or database servers for final HTTPS termination. Application firewalls are not configured to take advantage of security events or behavioral anomalies detected elsewhere in the environment in the same approximate timeframe, although correlation with those events is a typical practice when auditing the forensics of events via log files, long after the events have occurred.

Data security enforcement points such as column-level and file-level encryption/decryption systems have been developed to address sensitive data disclosure and theft. By setting policies for requests from legitimate users and/or applications, access rights to decrypted data are established and enforced. Some implementations also take behavioral policies into account, restricting access to data during specific time periods or limiting the number of records which can be returned in a single request or over a period of time. Requests for decrypted data outside these policy parameters are either denied entirely (no data is returned to the requesting user or application), or denied qualitatively (data is returned, but it remains encrypted and therefore unusable without cracking the encryption key).

Current data security systems, whether they are implemented as separate server appliances, co-located with one or more applications on the same host machine, or co-located with data services machines such as database servers, operate in real-time, intrusively in-line with the data they protect. When sensitive, encrypted data is requested by applications rather than directly by authenticated users, the "legitimate user" is frequently no more than the application name itself. Even in cases where an actual username is passed from the application along with the data request, the data security system is "blind" to whether or not the user is a hacker or has stolen legitimate user credentials. Data security systems are not configured to take advantage of application security events detected elsewhere in the environment in the same approximate timeframe, although correlation with those events is a typical practice when auditing the forensics of events via log files, long after the events have occurred.

FIG. 2 illustrates a perimeter security system 200 typically implemented in the prior art. This conventional perimeter security system 200 features a network firewall 210 (OSI layers 3-4), application firewalls 220 and 222 (OSI layer 7), and a network monitor 230 (OSI layers 3-4) for protecting two web servers 240 and 242. A router 215 is provided to route incoming traffic to one of the application firewalls 220 and 222 depending on which web server 240 and 242 is intended as the recipient of the traffic. One or more consoles 250 can be provided to alert an administrator of possible intrusions and suspicious traffic originating from a public network 260 as identified by network firewall 210, and/or application firewalls 220 and 222, the implementations of which are apparent to one of ordinary skill in the art. Similar systems might implement only one web server, thereby necessitating only one corresponding application firewall and eliminating the need for the router 215.

Application firewalls and network-layer intrusion detection system ("IDS") and intrusion protection system ("IPS") devices can be deployed in various network topologies which include, but are not limited to, other systems and devices such as network firewalls, routers, switches, load balancers, and blade server environments, the implementations of which are apparent to one of ordinary skill in the art. Communication to OSI layer 1-6devices and systems at the network layer has been established in the prior art as a way to block specific network activity; application firewalls may also participate in notifying network devices to drop or otherwise divert suspect IP address packets and traffic through such vendor-sponsored methods as Open Platform for Security ("OPSEC") (although the reverse has not been implemented, as application firewall blocking has been considered secondary to network blocking from the perimeter). While the combination of all these elements may make the application and network environment more efficient, they do not directly address the key issues of latency, throughput and coordination of real-time and near real-time response in the application-layer security elements. Application-layer security system administrators are therefore forced to choose between high-latency intrusion prevention and high-risk manual response to intrusion detection as the methods currently available to protect applications and sensitive data from application-layer hackers.

FIG. 3 illustrates a data security system 300 typically implemented in the prior art. This conventional data security system 300 features a network firewall 310 (OSI layers 3-4), data security enforcement points 370 and 372 (OSI layer 7), and a user directory 317 (OSI layer 7), protecting two data servers 344 and 346 used by applications 340 and 342. A router 315 is provided to route incoming traffic to one of the requesting applications 340 and 342 depending on which is intended as the recipient of the traffic. Application 342 verifies individual user credentials through user directory 317 before passing on each data request; application 340 does not typically distinguish individual users, simply passing an application credential ("authenticated" or "anonymous") with each data request. One or more consoles 350 can be provided to alert an administrator of illegal data requests and suspicious data requests (requests outside predetermined behavioral boundaries), the implementations of which are apparent to one of ordinary skill in the art. Similar systems might implement only direct administrative and/or local client-server access to a data server, thereby necessitating only one corresponding data security enforcement point and eliminating the need for the router 315. While each application 340 and 342 may or may not have an application firewall in-line to intercept malicious application-layer (i.e., OSI Layer 7) traffic, there is no mechanism for coordination between the data security system and the application firewalls in the same approximate timeframe.

There are deficiencies, therefore, in the related art relative to latency, throughput and coordination of real-time and near-real-time response to application-layer attacks and sensitive data misuse.

SUMMARY OF THE INVENTION

The present invention overcomes these and other deficiencies of the prior art by providing a Cooperative Processing and Escalation System ("CPES") and method comprising a plurality of application firewalls, non-intrusive application-layer monitors, and/or data security enforcement points (individually and collectively "security nodes"), one or more sets of escalation rules and a Security Console for system administration and/or near real-time escalation event relays. Escalation and offload processing is implemented between application firewall nodes and application monitor nodes (not intrusively in-line with applications). Escalation processing is implemented as well between application firewall and/or monitor nodes and data security nodes. Moreover, a hierarchy of Operational Modes with default processing status is implemented at each security node. Exemplary configuration models for both loosely coupled and tightly coupled security nodes are provided. Automatic or semi-automatic escalation and de-escalation of multi-node status and activity is implemented in real-time and/or near real-time as initial hacking probes or sensitive data misuse occur; semi-automatic or manual override of escalation and/or operational mode is also accommodated by the present invention.

In an embodiment of the invention, a cooperative processing and escalation method comprises the steps of: identifying a security violation at a security node, matching the security violation to one or more escalation rules of a pre-defined set of escalation rules, creating an escalation trigger associated with the matched escalation rule(s), and transmitting the escalation trigger to one or more receiving security nodes, wherein each of the receiving security nodes operates in two or more operational modes. The two or more operational modes are defined at one or more security nodes. The escalation trigger is processed at the receiving security node(s). The pre-defined set of escalation rules can be created automatically, semi-automatically, or manually. One or more of the pre-defined escalation rules specifies a duration of time in which an escalation to a different operational mode is enforced, followed by an automatic reversion to a default or other operational mode. Alternatively, one or more of the pre-defined escalation rules specifies an indefinite escalation to a different operational mode. The pre-defined set of escalation rules can be stored locally at or remotely from the security nodes. In one embodiment of the invention, the receiving security node is also the transmitting security node, which is otherwise known as self-escalation. An exemplary receiving security node is an application firewall, an application monitor, or a data security enforcement point. The receiving security node(s) can be defined as a logical or arbitrary grouping, defined automatically, semi-automatically or manually, comprising one or more application firewalls, application monitors, data security enforcement points, or a combination thereof. The step of defining two or more operational modes comprises the step of defining bypass, passive and active operational modes. The bypass, passive and active operational modes may optionally include sub-settings for logging and alerts associated with security violations and/or escalation triggers. The step of identifying a security violation comprises the step of analyzing in-bound or out-bound application traffic at the application-layer according to a security policy. The in-bound and/or out-bound application traffic can be transported via hypertext transport protocol (HTTP) or SSL-encrypted hypertext transport protocol (HTTPS). The step of identifying a security violation also comprises the step of examining data access requests and/or user data access behavioral patterns according to a security policy. The receiving security node processing includes the step of receiving an escalation trigger which supersedes a previously received escalation trigger. An operational mode may include forwarding a security violation alert to a security console, log or repository. An operational mode may include forwarding an escalation alert to a security console, log or repository.

In an embodiment of the invention, the active mode includes examining in-bound or out-bound application-layer traffic to detect escalation rule violations and/or examining data access requests and/or user data access behavioral patterns to detect escalation rule violations. The active mode may further include blocking, redirecting, or correcting an in-bound or out-bound security violation. The active mode may also further include denying access, masking data, or denying data decryption for a data access request. The active mode may also include receiving escalation triggers.

In an embodiment of the invention, the passive mode includes examining in-bound or out-bound application-layer traffic to detect escalation rule violations and/or data access requests and/or user data access behavioral patterns to detect escalation rule violations. The passive mode may further include receiving the escalation triggers.

In an embodiment of the invention, the bypass mode includes receiving the escalation triggers.

In an embodiment of the invention, the transmitting security node is an application firewall, an application monitor, or a data security enforcement point. In another embodiment of the invention, the transmitting security node is a network security device, wherein the network security device is a network firewall, network router or OSI layer 1-6 device. The transmission of an escalation alert can be routed peer-to-peer between the transmitting security node and the receiving security node(s). Alternatively, the transmission of an escalation alert can be routed from the transmitting security node to one or more hub-and-spoke network locations and thence forwarded to the receiving security node(s). In an embodiment of the invention, the transmitting security node is an application monitor tightly coupled with one or more the receiving application firewalls. In another embodiment of the invention, the transmitting security node is an application firewall tightly coupled with the receiving application monitor.

In yet another embodiment of the invention, an application monitor for observing one or more applications comprises programming instructions for implementing a process comprising the steps of: deciphering in-bound and/or out-bound application-layer network traffic, applying application-layer security violation policies to the application-layer traffic to detect application-layer security violations, and selectively alternating between one of two operational modes based on the detected application-layer security violations, wherein the two operational modes include a passive mode and a bypass mode. The deciphering step operates by placing the network interface of the security node into promiscuous mode, enabling receipt of in-bound and/or out-bound application-layer network traffic without the application monitor being directly in-line with the application(s) observed. The in-bound and/or out-bound network traffic can be transported via hypertext transport protocol (HTTP) or SSL-encrypted hypertext transport protocol (HTTPS). The application-layer security violation policies for one or more applications utilize the same logical detection rules as one or more near-proximity, in-line application firewalls, in order to validate whether in-bound or out-bound application traffic is malicious. The application monitor in the passive mode performs loosely coupled cooperative processing with the near-proximity application firewall(s) by offloading processing of security violation detection, security violation alerts, security violation logging, escalation alerts, and/or escalation logging for the observed application(s). Alternatively, the application monitor in the passive mode performs tightly coupled cooperative processing with the near-proximity application firewall(s) by offloading processing of security violation alerts, security violation logging, and/or escalation logging for the observed application(s). The passive mode includes the step of transmitting peer-to-peer escalation triggers directly to the tightly coupled application firewall(s) in the event that the detected security violation matches one or more of a predefined set of escalation rules.

In yet another embodiment of the invention, a cooperative processing and escalation system comprises: means for selectively configuring multiple network nodes to operate in two or more predetermined operational modes, and means for selectively activating the multiple nodes to operate in one of the two or more predetermined operational modes in near-real time. The network nodes can be one or more application-layer security nodes, one or more network-layer security nodes, or a combination thereof. The two or more predetermined operational modes include any two of a bypass mode, a passive mode, and an active mode.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF EMBODIMENTS

Figure 1:
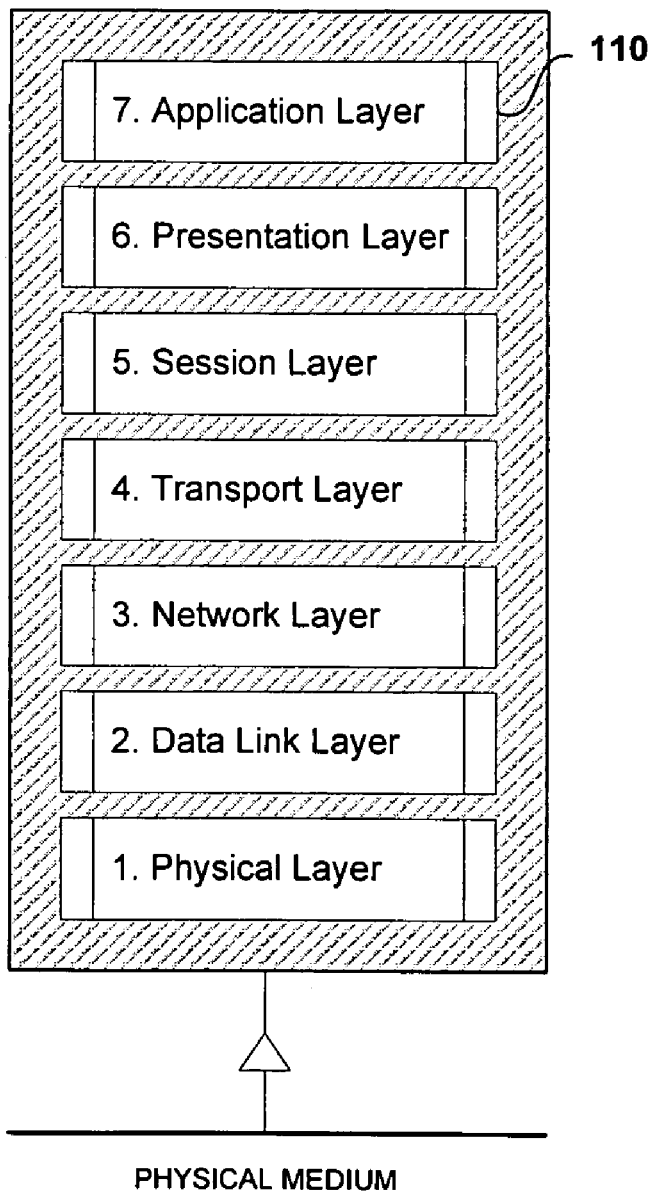
FIG. 1 illustrates an open systems interconnection model that defines a networking framework for implementing protocols in seven layers.
Figure 2:
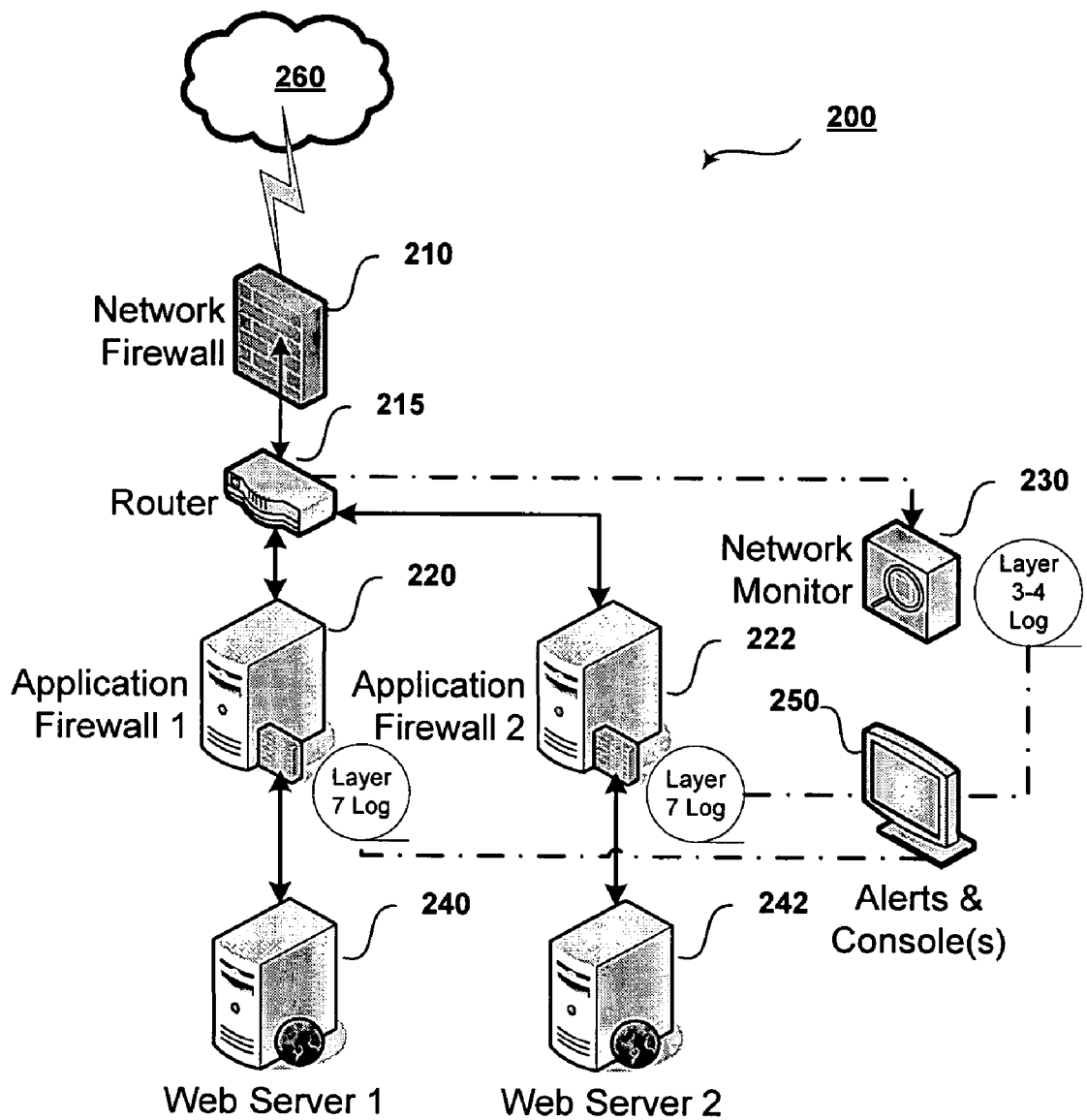
FIG. 2 illustrates a perimeter security system typically implemented in the prior art.
Figure 3:
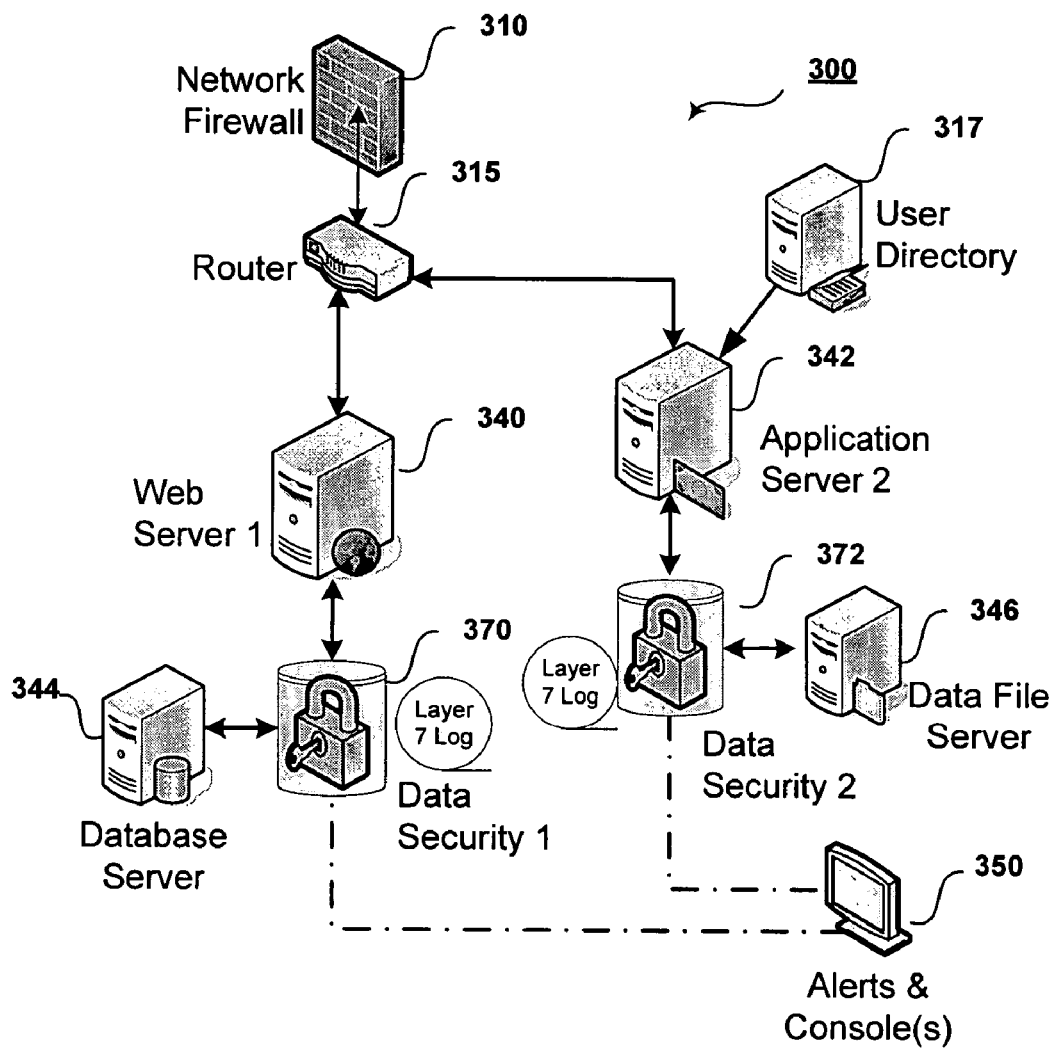
FIG. 3 illustrates a data security system typically implemented in the prior art.

Further features and advantages of the invention, which is generally referred to as a Cooperative Processing and Escalation System ("CPES"), method or technique, as well as the structure and operation of various embodiments of the invention, are described in detail below with reference to the accompanying FIGS. 4-13, wherein like reference numerals refer to like elements. The embodiments of the invention are illustrated in the context of the Internet, Web servers and database servers, and typically referred to as "perimeter application security." However, one of ordinary skill in the art readily recognizes that the invention also has utility in the context of intranets, extranets, application servers, file servers, data warehouses, and indeed any combination of networks and applications where application-layer security is to be applied.

Overview

According to at least one embodiment of the invention, a CPES comprises: rules for default operational modes, escalation triggers and de-escalation events (collectively, "escalation rules"); a security console for system configuration, hub-and-spoke relay of escalation triggers to and from loosely coupled affected security nodes, a display for displaying of near real-time system activity, at least one in-line application firewall security node, and at least one non-intrusive application monitor security node or in-line data security enforcement node. In addition, one or more of the application monitors may be tightly coupled to one or more of the application firewalls.

According to another embodiment of the invention, a CPES comprises: rules for default operational modes, escalation triggers and de-escalation events; a security console for system configuration, a display for displaying of near real-time system activity, at least one in-line application firewall security node, and at least one non-intrusive application monitor security node or in-line data security enforcement node. Relay of escalation triggers to and from loosely coupled affected security nodes is handled in a peer-to-peer fashion rather than hub-and-spoke through the security console, with security hub controllers positioned at each distributed site to collect, pass along and synchronize escalation triggers to other distributed peer-to-peer security node groups. In addition, one or more of the application monitors may be tightly coupled to one or more of the application firewalls.

Loose coupling may be defined both in terms of proximity (i.e., nodes are not observing and reacting to behavior for the same application, and therefore are not within close logical, physical or response timeframe proximity of each other should a security violation occur at one of the nodes) and/or the absence of direct interaction between the nodes (i.e., the nodes do not directly relay application traffic or escalation triggers between each other in a peer-to-peer fashion, but use a store-and-forward message routing such as hub-and spoke).

Tight coupling may be defined both in terms of proximity (i.e., nodes are observing and reacting to behavior for the same application, and therefore are within close logical, physical and response timeframe proximity of each other should a security violation occur at one of the nodes) and the presence of direct interaction between the nodes (i.e., one or more of the nodes directly relay application traffic or escalation triggers between each other peer-to-peer).

While "real-time" and "near real-time" have been used extensively to describe a timeframe element in the related and prior art (even interchangeably), the terms hold a very specific meaning in relation to application-layer security in the context of the present invention. "Real-time" system reaction is taken to mean a series of events which can occur within an immediate timeframe and in such a manner and location as to effect an automatic prevention outcome directly related to the initial triggering event. "Near real-time" system reaction is taken to mean a series of events which can occur within a relatively short period of time, the timeframe being affected by proximity and configuration, and in such a manner as to effect an automatic or semi-automatic reaction outcome related to the triggering event. Real-time events increase latency, while near real-time events do not. Thus, when the triggering event is the initial probe of a hacker against a targeted application, real-time security node reaction is only possible from a fully-activated application firewall in-line with the targeted application (and any other security nodes in-line behind the triggering application firewall, such as the data security enforcement node for the same application); any and all other events triggered within the system in relation to the initial hacker probe event occur in near real-time.

Since typical attacks by application-layer hackers require multiple probes of the targeted application using various techniques before entry is gained, a near real-time reaction to the initial violation has a high probability of success in limiting or eliminating damage to the targeted application, and indeed, to all applications with security nodes participating in the reaction. An "application monitor," inspecting the same application-layer in-bound and out-bound traffic with the same security violation policies as an application firewall, except in near real-time (without being situated directly in-line with the subject application), can therefore effectively participate in a CPES. By utilizing a network sniffing architecture rather than an in-line architecture such as reverse-proxy, the application monitor can decipher HTTP/HTTPS traffic, both in-bound and out-bound, from a SPAN or TAP network connection in promiscuous mode—the closer proximity to the observed application(s) upstream in the network topology, the shorter the reaction timeframe. Furthermore, when the same application traffic and security violation policies are in effect for a non-intrusive application monitor as for one or more in-line application firewalls, the application monitor can assume processing responsibilities for security violation detection, security violation logging, violation alerts and CPES escalation alerts.

The estimated probability that a hacker will cause severe damage on an initial probing attempt represents the perceived security risk the system administrator may leverage when configuring the CPES. This ability to selectively configure a CPES to make trade-offs between latency and perceived security risk is a principal feature of the present invention, as is the ability to proactively activate application-layer prevention defenses selectively across multiple security nodes in near real-time to defend against the probability that the hacker will move on to yet another application to continue the violation attempt.

In order to simplify initial configuration of the system, near proximity application firewall(s) and application monitor(s) utilize the same logical detection rules and security policies to validate whether in-bound or out-bound application traffic is malicious, but this is not a requirement for successful operation of the system. Application firewalls and application monitors may include multiple security policies addressing prevention and detection for more than one application; application monitors may include multiple security policies equivalent to those deployed at one or more application firewalls.

CPES Escalation Rules

In order to affect the goals of a CPES (in various embodiments the ability to selectively configure a CPES to make trade-offs between latency and perceived security risk and to proactively activate and de-activate application-layer prevention defenses selectively across named security nodes, logical groups of security nodes and distributed site locations, in automatic, semi-automatic or manual fashion), a cohesive set of escalation rules should be defined. Escalation rules may be created automatically (through inference, learning-mode, or other automated process known to those of ordinary skill in the art), semi-automatically (through a presentation of automated rules for acceptance or rejection by an operator) or manually (by an operator).

In an embodiment of the invention, escalation rules in a CPES comprise:
   a. Reference-able identification of each participating security node, usually by name; IP address and type (e.g., application firewall, application monitor, data security enforcement point);
   b. If logical groups of participating security nodes are used, a pointer to the logical group list;
   c. Default Operational Mode of each security node (Bypass, Passive or Active—see "Operational Modes" below);
   d. When in Passive Mode operation, whether security violation alerts and/or logging should occur (optional);
   e. When in Active Mode operation, whether security violation alerts and/or logging should occur (optional);
   f. When in Passive Mode operation, whether escalation alerts and/or logging should occur (optional);
   g. When in Active Mode operation, whether escalation alerts and/or logging should occur (optional);
   h. Indicator of whether each security node may receive escalation triggers, send escalation triggers, or both;
   i. If the security node may send escalation triggers, one or more escalation trigger events, which indicate malicious behavior and/or increased application-layer security risk (e.g. a hacking probe, unusual data access request(s) or operator-scheduled date/time parameters);
   j. For each escalation trigger event:
      i. The Operational Mode for activation at receiving security nodes;
      ii. The Operational Mode for self-escalation of the triggering security node, if any;
      iii. The list of security nodes or logical groups, which will receive the escalation trigger, as well as the method of notification for each (peer-to-peer for tightly coupled or time-sensitive nodes, hub-and-spoke relay for loosely coupled nodes or distributed sites);
      iv. The duration of the escalation (a period of time or indefinitely until manual operator intervention);
      v. The Operational Mode for activation at each receiving security node once the escalation duration has expired (default Operational Mode or other Operational Mode);
      vi. A description and severity level for the escalation trigger event (optional, for logging and alerting purposes)
   k. Indicator of whether the escalation rule is currently active, or "on";
   l. Current Operational Mode of the local security node;
   m. Indicator of whether escalation is "in progress" at the local security node;
   n. Escalation expiration time at the local security node (if escalated);
   o. Indicator of whether escalation logging is "on" or "off" at the local security node (optional);
   p. Indicator of whether escalation alerts are "on" or "off" at the local security node (optional).

It should be appreciated that the CPES escalation rules of the present invention can be implemented and specified in numerous ways, particularly with regard to storage and representation: in one embodiment of the invention, rules are stored locally at each participating security node to minimize latency and reaction time, in whatever representation format (XML, proprietary flat file, encrypted, etc.) is best suited to the individual node; rules may be duplicated or centralized at the security console or escalation hub controller(s) to enhance policy management, persistence, auditability, efficiency, usability, etc. Similarly, communication protocols for peer-to-peer, hub-and-spoke, waterfall, store-and-forward or other indirect relay dissemination of escalation triggers, alerts, de-escalation commands, etc., can be implemented and configured in numerous ways, as such implementation alternatives are readily apparent to those skilled in the art.

Operational Modes

Figure 4:
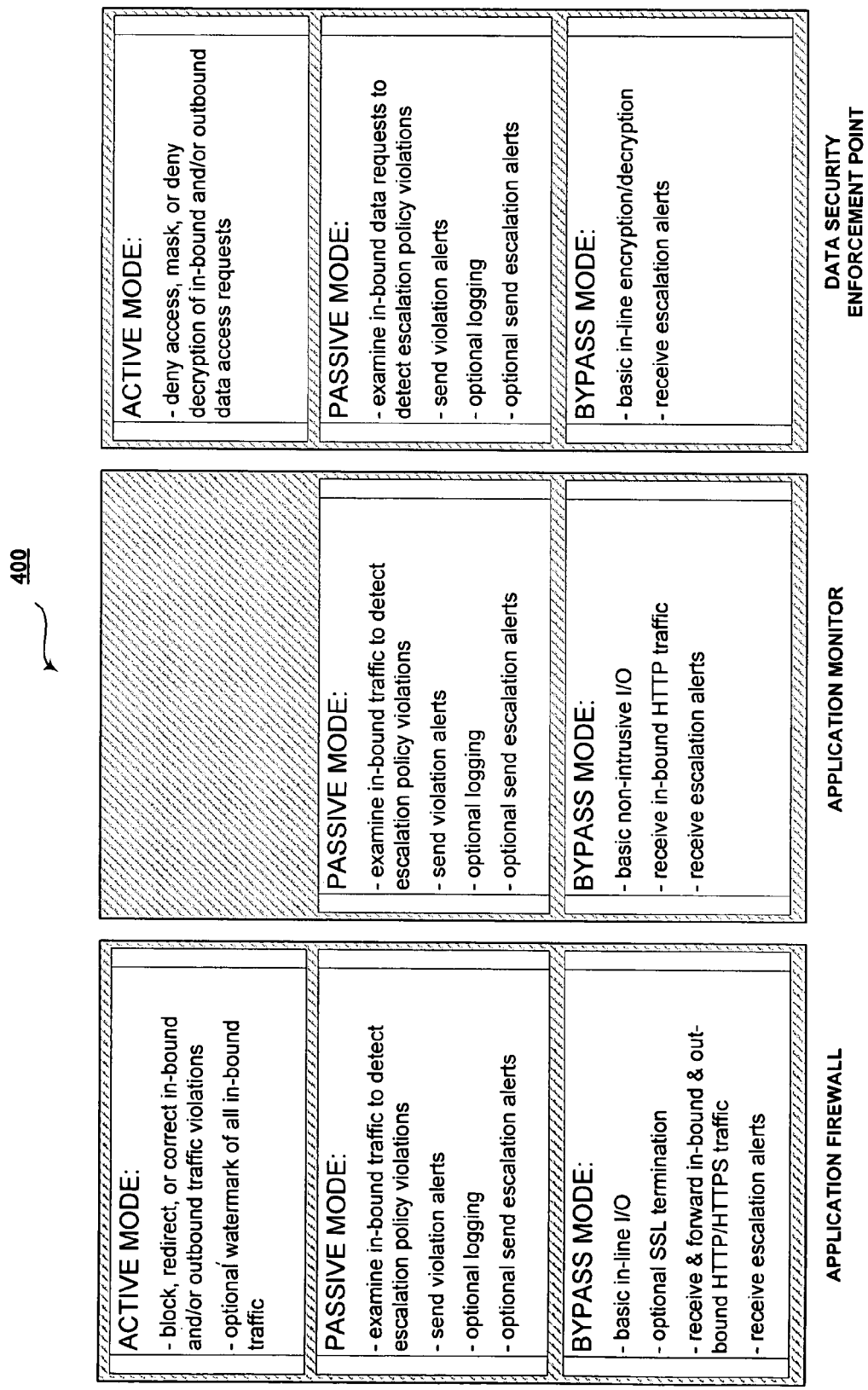
FIG. 4 illustrates an Operational Mode hierarchy for application firewalls, application monitors and data security enforcement points according to an embodiment of the invention.

In order to affect the cooperative offload processing, tight or loose coupling configuration and escalation processing aspects of the invention, the security nodes participating in the CPES must possess certain common operational modes and behavior. FIG. 4 illustrates an Operational Mode hierarchy 400 enacted by application firewalls, application monitors and data security enforcement points according to an embodiment of the invention, and indicates the progressive hierarchy of behavior associated with each Operational Mode. Any combination or subset of the Operational Modes may be selected as part of a default security node configuration.

A Bypass Mode is the lowest level of the Operational Mode hierarchy 400. Security nodes operating in Bypass Mode perform basic operations and "listen" for escalation alerts to trigger a higher Operational Mode, but perform no detection or prevention of malicious behavior at the application-layer. As an application firewall is in-line with downstream application(s) and data, it receives and forwards both in-bound and out-bound application traffic to and from the downstream application(s). If the traffic is in HTTPS protocol, it may optionally terminate the Secure Sockets Layer (SSL) before forwarding the traffic. As an application monitor is not in-line with downstream application(s), it receives duplicate in-bound HTTP application traffic broadcast to it from an upstream device. As a data security enforcement point is in-line with downstream data, it receives and processes in-bound data requests, encrypting and decrypting according to predetermined data access security policies, returning data to the requestor. Bypass Mode operation provides the least possible latency, highest bandwidth and transaction throughput (for application firewalls), and lowest CPU consumption of any Operational Mode. In an embodiment of the invention, the Security Console and other security nodes will never receive an escalation alert from a security node operating in Bypass Mode, further reducing network traffic and operator distraction.

A Passive Mode is the second level of the Operational Mode hierarchy 400. In addition to performing all of the tasks associated with Bypass Mode, security nodes operating in Passive Mode perform malicious behavior detection tasks, examining the in-bound application traffic and/or data requests against their respective escalation security rules to detect possible violations of interest across applications, logical application-layer groups and/or distributed site locations. Each detected violation may optionally be sent to the Security Console as an alert. Security nodes operating in Passive Mode may optionally produce logs of activity (e.g. alerts, transactions, changes in Operational Mode, statistics, etc.) for later audit and forensics analysis. If escalation rules are on for the security node at the Passive Mode level, an escalation alert will be sent to the Security Console and to any other tightly-coupled (or peer-to-peer) security node when a violation is detected. Passive Mode operation provides lower latency for application firewalls than Active Mode. Latency and CPU consumption may be further reduced by turning off logging and/or escalation rules for the application firewall. Passive Mode will be the usual default in the Operational Mode hierarchy for application monitors, as latency is not an issue. Passive Mode is also the usual default for data security enforcements points participating in a CPES environment, as normal encryption/decryption occurs while both receiving and/or detecting escalation events.

An Active Mode is the highest level of the Operational Mode hierarchy 400, and is only applicable to application firewalls and data security enforcement points. In addition to performing all of the tasks associated with Bypass and Passive Modes, application firewalls operating in Active Mode perform intrusion prevention tasks according to their respective security rules. These tasks are usually characterized by the ability to block, redirect, correct or otherwise manipulate in-bound and/or out-bound application traffic deemed malicious or flawed according to security policy. The application firewall may optionally watermark in-bound traffic via a mechanism such as a hash algorithm as part of a scheme to prevent circumvention of the application firewall according to security policy. In addition to performing all of the tasks associated with Bypass and Passive Modes, data security enforcement points operating in Active Mode perform data change and disclosure prevention tasks according to their respective security rules. These tasks are usually characterized by the ability to deny access, mask, deny decryption or otherwise suspend normal data access according to security policy, for all or selective data access requests, during the period in which escalation to Active Mode is in effect. Violation alerts, logging and escalation rules may be turned on for Active Mode, even if they were off for Passive Mode. Active Mode represents the customary, highest level of latency and CPU usage.

It should be appreciated that the present invention can be implemented and configured in numerous ways, particularly with regard to the number, type, grouping and combination of cooperative coupling models employed to offload processing from in-line security nodes to non-intrusive security nodes, with regard to logical groupings of loosely coupled security nodes, with regard to actions performed in Active Mode at data security enforcement point nodes, and with regard to the methods for communicating alerts and escalation rules between security nodes and operations consoles. Several exemplary embodiments of the present invention are described below.

Configurations

Figure 5:
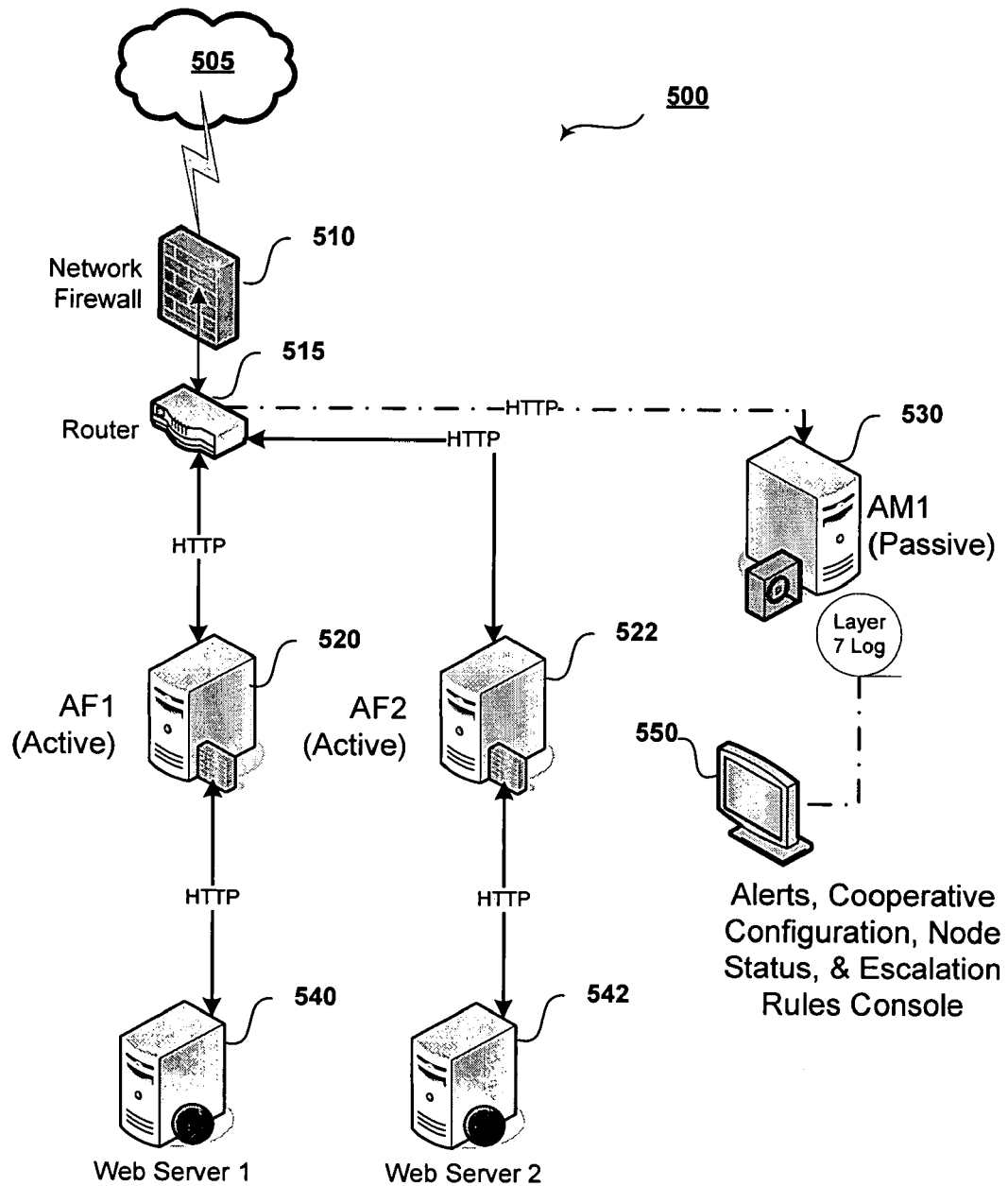
FIG. 5 illustrates a loosely coupled default Cooperative Processing and Escalation System ("CPES") according to an embodiment of the invention.

FIG. 5 illustrates a loosely coupled default configuration CPES 500 according to an embodiment of the invention. Specifically, the CPES 500 comprises a network firewall 510, a router 515, two active application firewalls 520 (AF1) and 522 (AF2) loosely coupled with a passive application monitor node 530 (AM1), two Web servers 540 and 542, and a Security Console 550. The application firewalls 520 and 522, in Active Mode, provide intrusion prevention for HTTP application traffic to and from the Web servers 540 and 542. The application monitor node 530, in Passive Mode with logging, provides intrusion detection for the same Web servers 540 and 542. A router 515 is provided to route incoming traffic to one of the application firewalls 520 and 522 depending on which web server 540 and 542 is intended as the recipient of the traffic.

Escalation rules are off in the CPES 500, whose primary benefit is the offloading of logging and violation alerts processing from the firewalls 520 and 522 to the monitor 530, reducing CPU consumption on the firewalls 520 and 522, and latency to the Web servers 540 and 542. Intrusion prevention is performed with no degradation of security strength; logging and violation alerts are provided for all in-bound traffic in near real-time by the monitor 530 to the Security Console 550.

Figure 6:
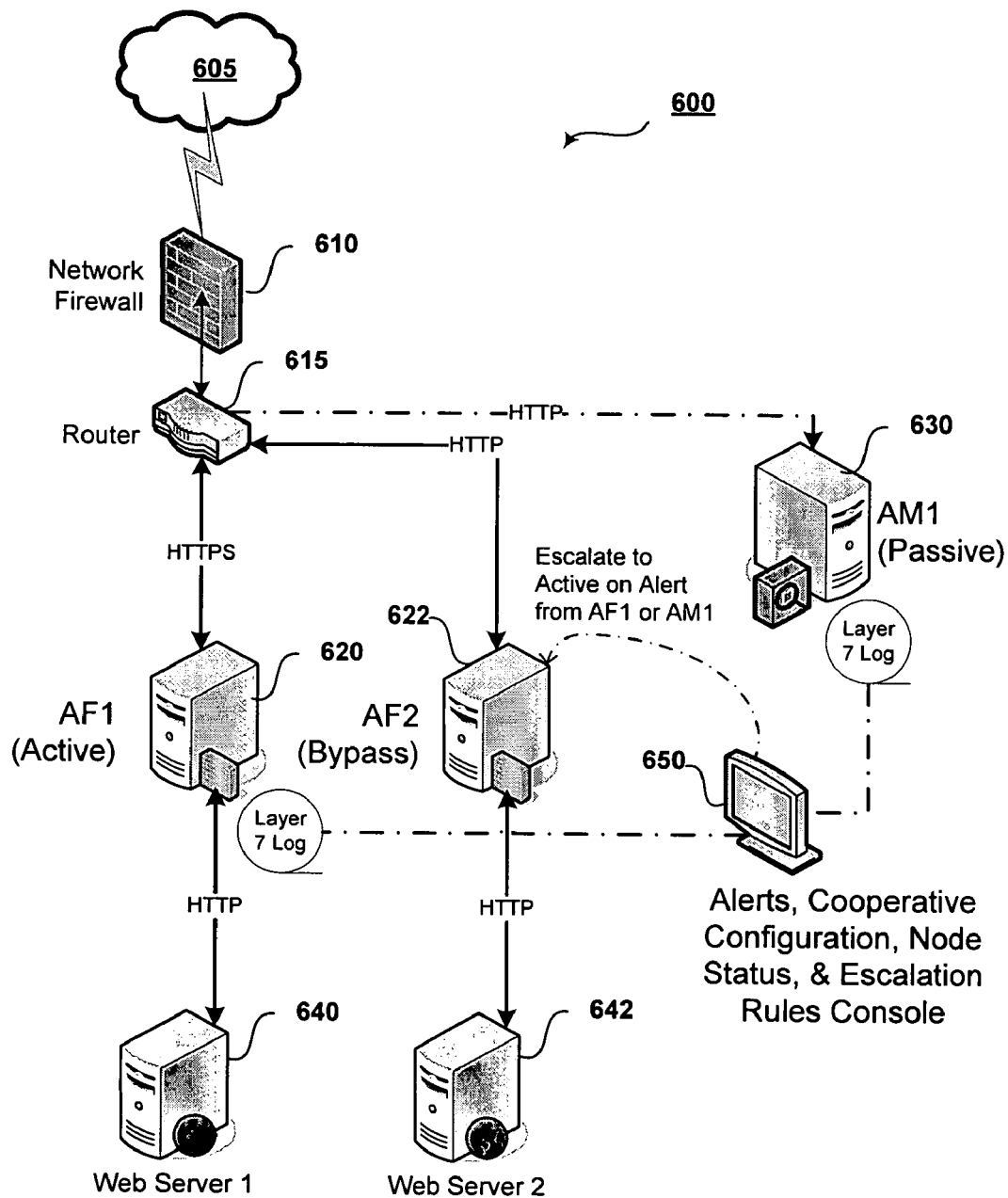
FIG. 6 illustrates a loosely coupled default configuration CPES according to another embodiment of the invention.

FIG. 6 illustrates a loosely coupled default configuration CPES 600 according to an embodiment of the invention. Particularly, the CPES 600 comprises a network firewall 610, a router 615, one or more application firewalls 620 (AF1) in Active Mode with logging providing intrusion prevention for HTTPS application traffic to and from one or more Web servers 640, one or more application firewalls 622 (AF2) in Bypass Mode directing HTTP application traffic to and from one or more Web servers 642; an application monitor 630 (AM1) in Passive Mode with logging providing intrusion detection for the same Web servers 640 and 642, and a Security Console 650.

Escalation rules are on at the application firewalls 620 and the application monitor 630. The benefits include the offloading of logging and violation alerts processing from the application firewalls 622 to the application monitor 630, reducing CPU consumption on the application firewalls 622 and lowest possible latency to its associated Web servers 642. Intrusion prevention is performed at the application firewalls 620 with no degradation of security strength; logging and violation alerts for the application firewalls 622 are provided for all in-bound traffic in near real-time by the application monitor 630 to the Security Console 650. In the event of a violation detected at either the application firewalls 620 or the application monitor 630, an escalation alert is relayed through the Security Console to the application firewalls 622, escalating the application firewalls 622 to its designated higher Operational Mode for the period of time established in the escalation rules. It should be noted that a violation at the application monitor 630 might set the application firewalls 622 to Active Mode, while a violation at the application firewalls 620 might set the application firewalls 622 only to Passive Mode, according to the level of risk deemed acceptable by the system administrator when the escalation rules were designed.

Figure 7:
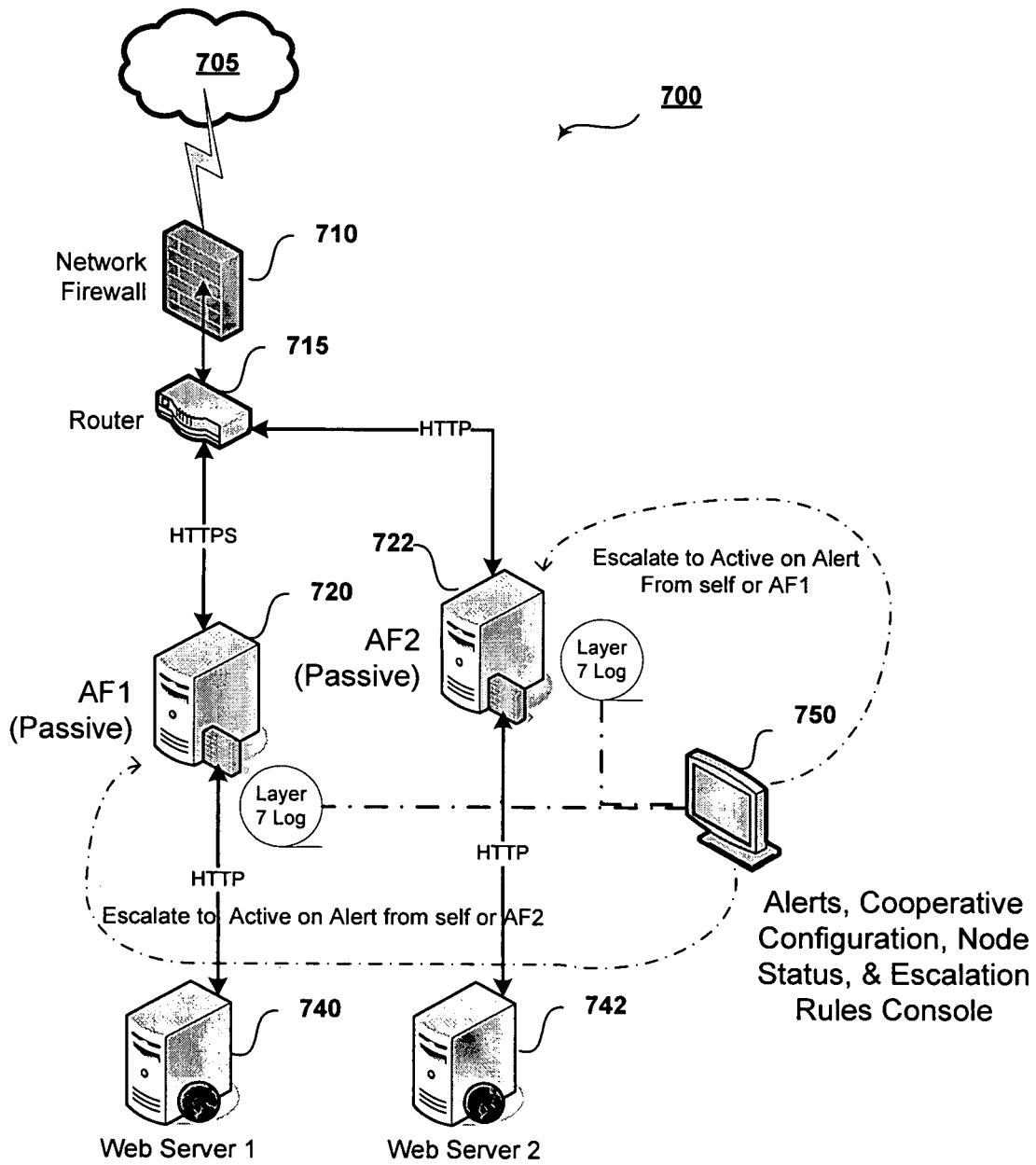
FIG. 7 illustrates a loosely coupled default configuration CPES according to another embodiment of the invention.

FIG. 7 illustrates a loosely coupled default configuration CPES 700 according to an embodiment of the invention. Particularly, the CPES 700 comprises a network firewall 710, a router 715, two application firewalls 720 (AF1) and 722 (AF2) in Passive Mode with logging providing intrusion detection for HTTP application traffic to and from Web servers 740 and 742, and a Security Console 750.

Escalation rules are on at the application firewalls 720 and 722. The benefits include reduced CPU consumption and latency at the application firewalls 720 and 722, with near real-time escalation of participating security nodes to full Active Mode status at the first detected intrusion attempt anywhere in the group. Intrusion detection only is the default at all nodes; logging and violation alerts for all in-bound traffic are provided in near real-time to the Security Console 750. In the event of a violation detected at either the application firewall 720 or 722, the initial detecting security node will first self-escalate to Active Mode and then relay an escalation alert through the Security Console 750 to the other loosely coupled security nodes according to the established escalation rules. Note that self-escalation may trigger in real-time or in near real-time, according to the level of risk deemed acceptable by the system administrator when the escalation rules were designed.

Figure 8:
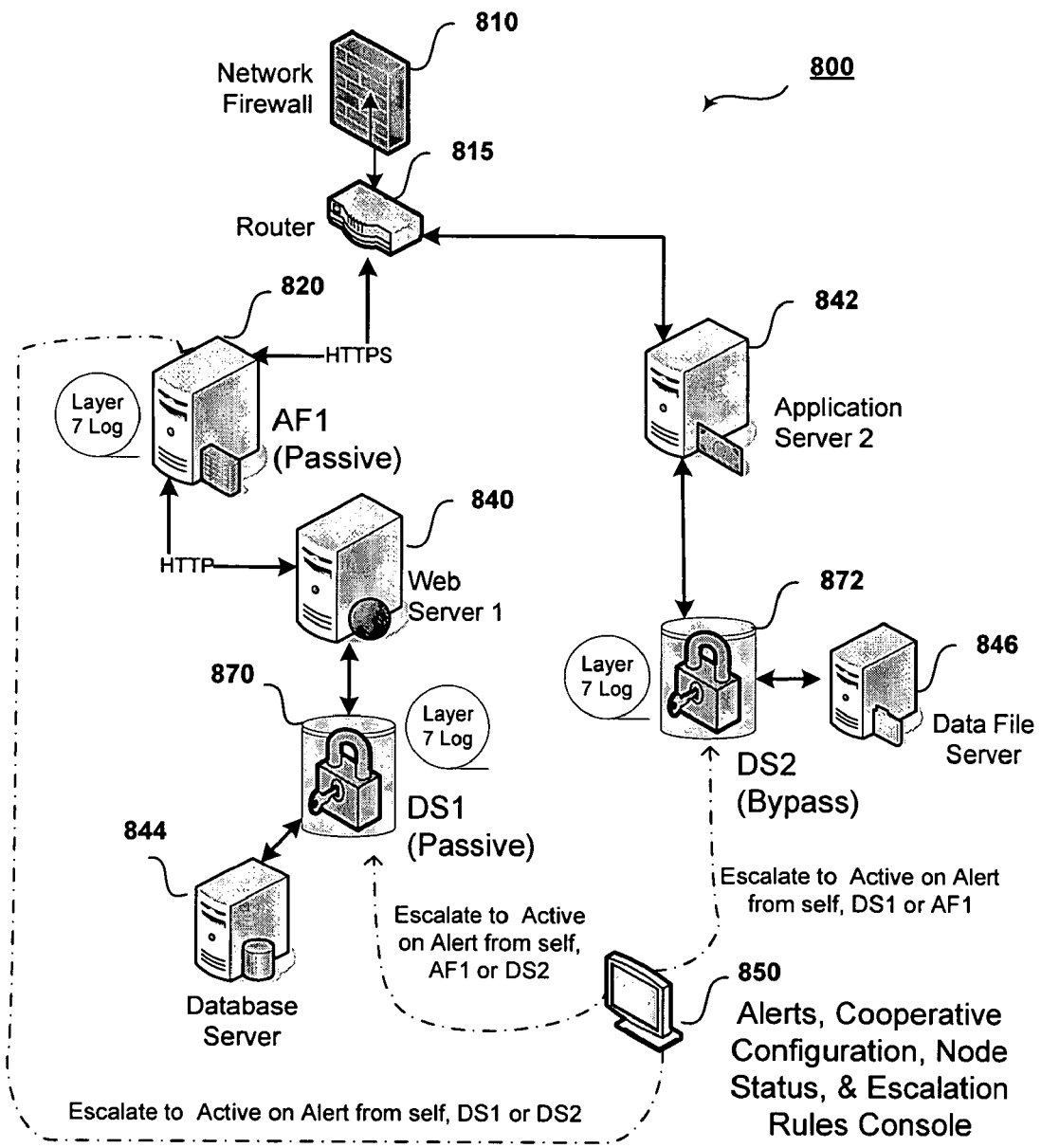
FIG. 8 illustrates a loosely coupled default configuration CPES according to another embodiment of the invention.

FIG. 8 illustrates a loosely coupled default configuration CPES 800 according to an embodiment of the invention. Particularly, the CPES 800 comprises a network firewall 810, a router 815, an application firewall 820 (AF1) in Passive Mode with logging providing intrusion detection for HTTP application traffic to and from one or more Web servers 840, a data security enforcement point 870 (DS1) in Passive Mode with logging providing encryption/decryption of sensitive data requests between Web servers 840 and database servers 844, a data security enforcement point 872. (DS2) in Passive Mode with logging providing encryption/decryption of sensitive data requests between application servers 842 and data servers 846, and a Security Console 850.

Escalation rules are on at the application firewalls 820 and data security enforcement points 870 and 872. The benefits include reduced CPU consumption and latency at the application firewalls 820, with near real-time escalation of participating security nodes 820, 870 and 872 to full Active Mode status at the first detected intrusion attempt or unusual data access behavior anywhere in the group. Detection of escalation rule violations only is the default at all nodes; logging and violation alerts for all in-bound traffic and data access are provided in near real-time to the Security Console 850. In the event of a violation detected at any of the application firewall 820 or data security enforcement points 870 or 872, the initial detecting security node first self-escalates to Active Mode and then relays an escalation alert through the Security Console 850 to the other loosely coupled security nodes according to the established escalation rules. Note that self-escalation may trigger in real-time or in near real-time, according to the level of risk deemed acceptable by the system administrator when the escalation rules were designed.

Figure 9:
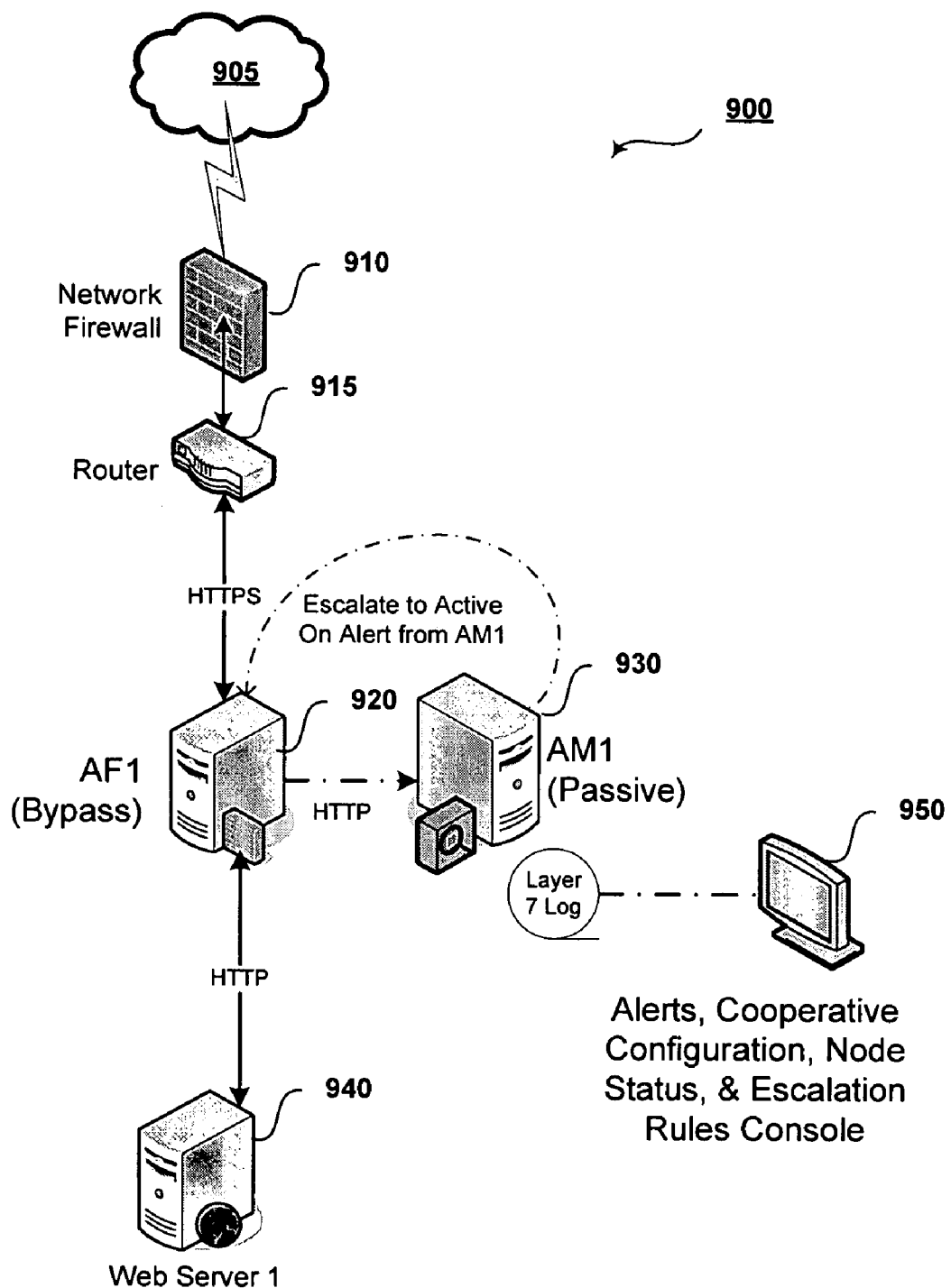
FIG. 9 illustrates a tightly coupled default configuration CPES according to an embodiment of the invention.

FIG. 9 illustrates a tightly coupled default configuration CPES 900 according to an embodiment of the invention. Particularly, the CPES 900 comprises a network firewall 910, a router 915, one application firewall 920 (AF1) in Bypass Mode terminating SSL for HTTPS application traffic to and from one or more Web servers 940; an application monitor 930 (AM1) in Passive Mode with logging providing intrusion detection for the same Web servers 940 as the application firewall 920, and a Security Console 950. The application firewall 920 forwards a copy of in-bound HTTP application traffic to the application monitor 930.

Escalation rules are on at the application monitor 930. The benefits include the offloading of logging and violation alerts processing from the application firewall 920 to the application monitor 930, reducing CPU consumption on the application firewall 920 and lowest possible latency to its associated Web servers 940, a shorter near real-time window reducing risk for Web servers downstream from the application firewall 920, and, in the exemplary illustration, a method for providing the application monitor 930 with access to in-bound application traffic which originated as HTTPS (not possible in loosely coupled configurations). Logging and violation alerts for the application firewall 920 are provided for all in-bound traffic in near real-time by the application monitor 930 to the Security Console 950. In the event of a violation detected at the application monitor 930, an escalation alert is relayed directly to the application firewall 920, escalating the application firewall 920 to its designated higher Operational Mode (Active Mode is recommended in this case) for the period of time established in the escalation rules; the application monitor 930 also relays the escalation alert to the Security Console 950 (which, in turn, will relay the escalation alert to other security nodes in the CPES 900 according to the escalation rules).

Figure 10:
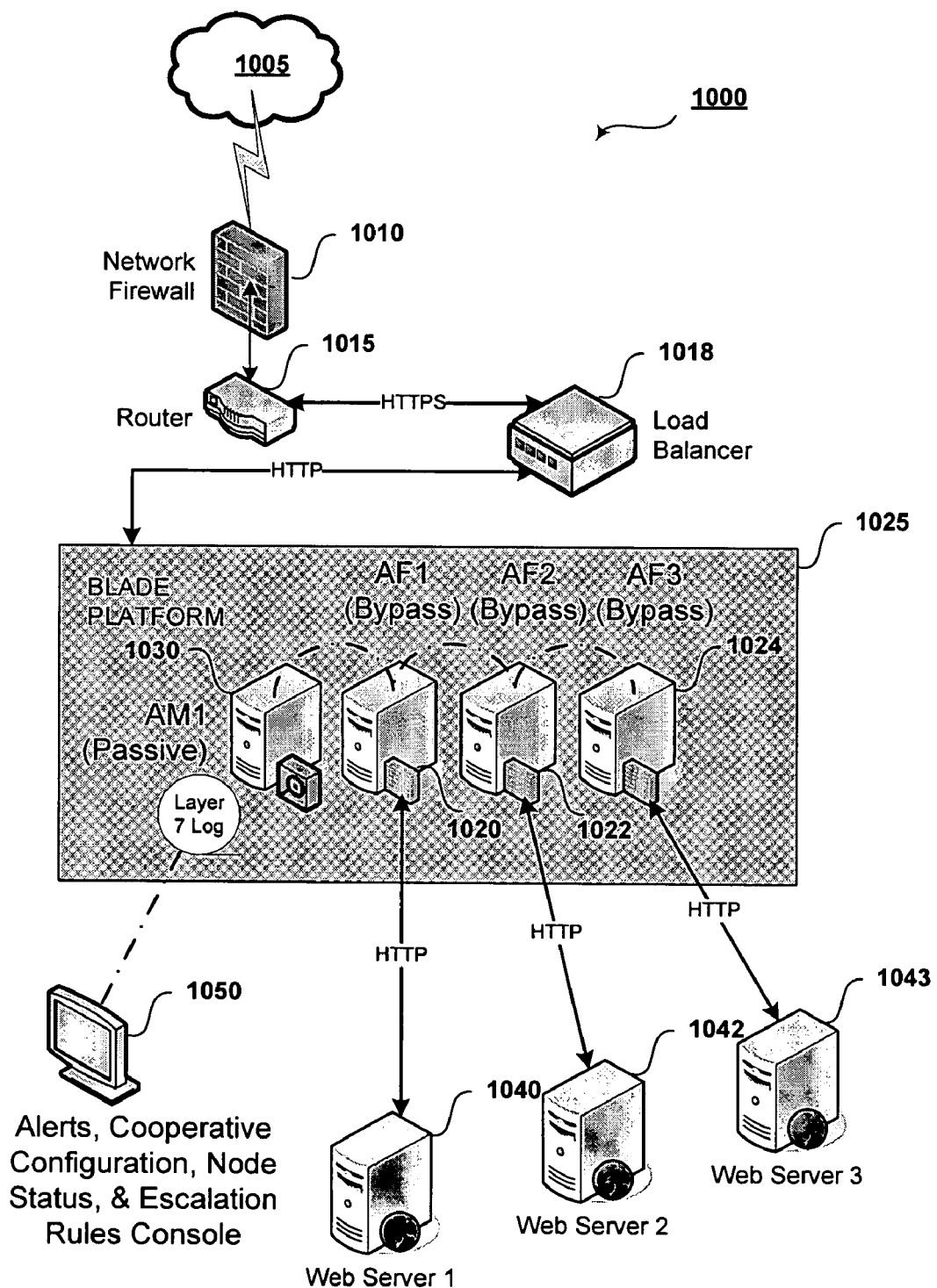
FIG. 10 illustrates a tightly coupled default configuration CPES according to another embodiment of the invention.

FIG. 10 illustrates a tightly coupled default configuration CPES 1000 according to an embodiment of the invention. Particularly, the CPES 1000 comprises a network firewall 1010, a router 1015, a blade platform 1025 behind a load balancer 1018, and a Security Console 1050. The blade platform ("server environment") 1025 comprises one or more application firewalls (e.g., application firewalls 1020, 1022, and 1024, which are noted as AF1, AF2, and AF3, respectively) in Bypass Mode directing HTTP application traffic to and from one or more corresponding Web servers (e.g., Web servers 1040, 1042, and 1043) and an application monitor 1030 (AM1) in Passive Mode with logging providing intrusion detection for the same Web servers as the Web servers 1040, 1042, and 1043.

The Security Console 1050, the network firewall 1010, the router 1015, and the load balancer 1018 in this exemplary embodiment are located outside the blade server environment 1025, but it will be apparent to one of ordinary skill in the art that any or all of these elements might also be located within the blade server environment 1025. The implementation of the load balancer 1018 is apparent to one of ordinary skill in the art.

Escalation rules are on at the application monitor 1030. The benefits of this exemplary embodiment include the offloading of logging and violation alerts processing from the application firewalls 1020, 1022, and 1024 to the application monitor 1030, reducing CPU consumption on the application firewalls 1020, 1022, and 1024, and lowest possible latency to the respective Web servers 1040, 1042, and 1044, the shortest near real-time window (coupling each security node through high-capacity cable-less services in the blade server, rather than through the usual network card interfaces) reducing risk for Web servers 1040, 1042, and 1044 downstream from the application firewalls 1020, 1022, and 1024, and, in the exemplary illustration, a technique for providing the application monitor 1030 with access to in-bound application traffic which originated as HTTPS (not possible in loosely coupled configurations). Logging and violation alerts for the application firewalls 1020, 1022, and 1024 are provided for all in-bound traffic in near real-time by the application monitor 1030 to the Security Console 1050. In the event of a violation detected at the application monitor 1030, an escalation alert is relayed directly to the application firewalls 1020, 1022, and 1024, escalating the application firewalls 1020, 1022, and 1024 to their respective designated higher Operational Modes (Active Mode is recommended in this case) for the period of time established in the escalation rules; the application monitor 1030 also relays the escalation alert to the Security Console 1050 (which, in turn, will relay the escalation alert to other security nodes in the CPES 1000 according to the escalation rules).

Escalation Activation and De-Activation

Figure 11:
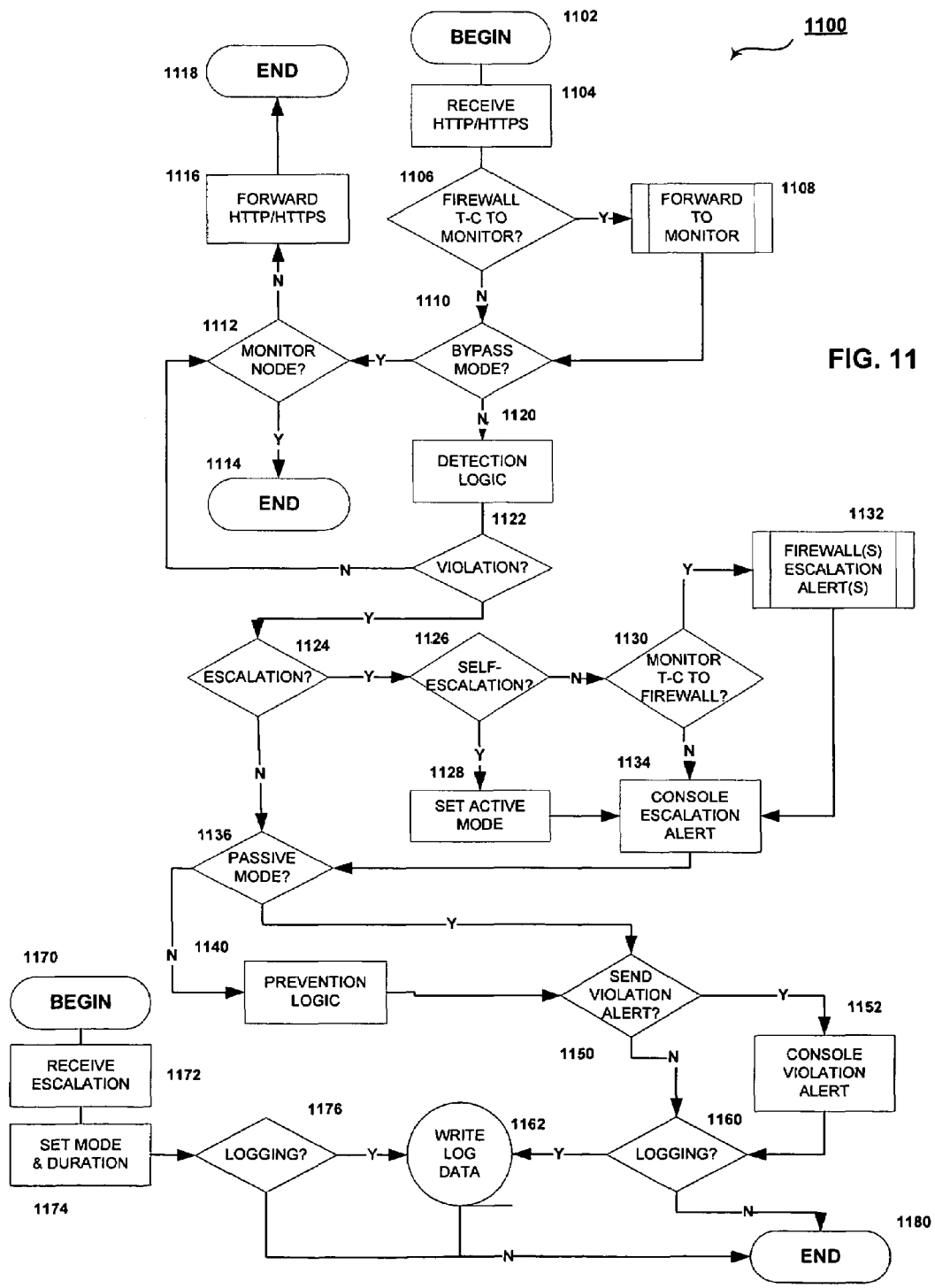
FIG. 11 illustrates an escalation rules activation process according to an embodiment of the invention.

FIG. 11 illustrates an application firewall or application monitor escalation activation method 1100 according to an embodiment of the invention. The method 1100 accommodates sending escalation triggers according to escalation rules when escalation event conditions are met beginning at 1102, and accommodates receiving an escalation trigger from another participant in the CPES beginning at 1170.

Beginning at 1102, the security node receives HTTP/S traffic 1104 either in-bound to an application or out-bound from an application. At 1106, if this security node is an application firewall tightly coupled to an application monitor (for purposes of cooperative processing offload, for example), the traffic at 1104 is immediately forwarded to the monitor node in 1108. If the security node is currently in Bypass Mode 1110, and the security node is not a monitor at 1112, traffic at 1104 is simply forwarded to it's normal location at 1116 and method 1100 ends at 1118, else method 110 ends at 1114. If the security node is not currently in Bypass Mode at 1110, the security node performs it's usual application-layer security detection function at 1120. If an application-layer security violation has not been detected 1122, and the security node is a monitor at 1112, then method 1100 ends at 1114, else traffic at 1104 is forwarded to it's normal location at 1116 and method 1100 ends at 1118.

If an application-layer security violation was detected at 1122, the violation is checked for a match to any escalation trigger rules at 1124 (assuming escalation is turned on at this security node). If the violation did not match any escalation trigger rules at 1124 (e.g., in the case where the operator who set up the escalation rules did not specify that this type of violation posed a great enough risk to other applications, databases, or sites in the CPES to warrant an escalation trigger), then escalation processing at 1126 through 1134 is skipped and an escalation trigger is not sent out to the CPES. If the violation matched an escalation trigger rule at 1124, the rule is checked for self-escalation at 1126, as the ability to prevent the security violation in real-time requires an application firewall security node be in Active Mode at 1128. If self-escalation at 1126 is not indicated by the escalation rule, as would be the case for an application monitor security node, the rules is checked to determine if this is a monitor tightly coupled to one or more application firewalls at 1130—if this is the case, the escalation trigger is sent to the tightly coupled application firewall(s) 1132 at (the implementation of the escalation rule would be to send the escalation trigger for Active Mode, peer-to-peer, in order to reduce the near real-time response at the receiving application firewall(s) to as short a window as possible). The escalation rule for alerting the security console that the escalation trigger event has occurred is now processed at 1134. If the security node is currently not in Passive Mode 1136, i.e., it is in Active Mode, the security node performs it's usual application-layer security prevention function at 1140.

Operational Mode settings at the security node are checked to determine whether a violation alert should be sent 1150, as cooperative processing may have offloaded this responsibility to a tightly or loosely coupled application monitor in the CPES—if this security node is sending it's own violation alerts, that activity is performed at 1152. Operational Mode settings at the security node are checked to determine whether logging should occur 1160, as cooperative processing may have offloaded this responsibility to a tightly or loosely coupled application monitor in the CPES—if this security node is performing it's own logging, that activity is performed at 1162. Method 1100 ends at 1180.

Beginning at 1170, the security node receives an escalation trigger from the CPES, or a manual (de-)escalation command from the security console, at 1172 (distinct from HTTP/S traffic 1104). The new Operational Mode is set as the current mode, and the duration of escalation is set, according to the escalation trigger or override by the security console operator 1174—escalation duration is checked periodically at 1110 with a return to default Operational Mode when the duration has been exceeded. Operational Mode settings at the security node are checked to determine whether logging should occur 1160, as cooperative processing may have offloaded this responsibility to a tightly or loosely coupled application monitor in the CPES—if this security node is performing it's own logging, that activity is performed 1162. Method 1100 ends at 1180.

Figure 12:
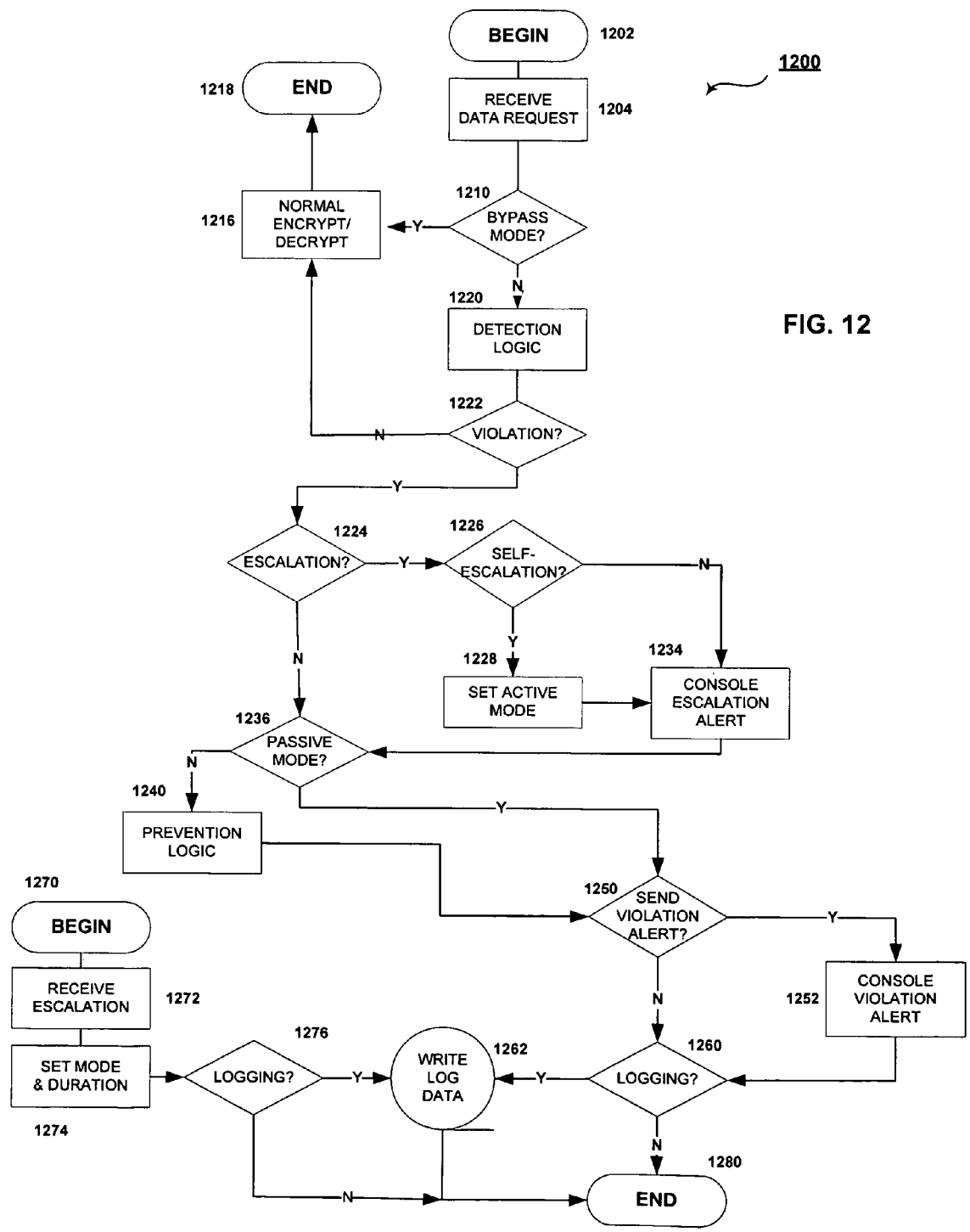
FIG. 12 illustrates an escalation rules activation process according to another embodiment of the invention.

FIG. 12 illustrates data security enforcement point escalation activation process 1200 according to an embodiment of the invention. The method 1200 accommodates sending escalation triggers according to escalation rules when escalation event conditions are met beginning at 1202, and accommodates receiving an escalation trigger from another participant in the CPES beginning at 1270.

Beginning at 1202, the security node receives a data access request 1204 initiated by an application, user or other process. If the security node is currently in Bypass Mode 1210, the data request 1204 is simply processed according to it's normal function 1216 (usually encryption or decryption of data, add/insert/update/delete of records, etc. as specified for the requesting user privileges) and method 1200 ends at 1218. If the security node is not currently in Bypass Mode 1210, the security node performs specific application-layer security detection functions beyond it's normal function, for example anti-fraud checks, unusual request behavior or frequency, etc., at 1220. If an application-layer security violation has not been detected at 1222, then the data request 1204 is forwarded to it's normal processing 1216 and method 1200 ends at 1218. If an application-layer security violation was detected 1222, the violation is checked for a match to any escalation trigger rules 1224. If the violation did not match any escalation trigger rules 1224 (e.g., in the case where the operator who set up the escalation rules did not specify that this type of violation posed a great enough risk to other applications, databases, or sites in the CPES to warrant an escalation trigger), then escalation processing 1226 through 1234 is skipped and an escalation trigger is not sent out to the CPES. If the violation matched an escalation trigger rule 1224, the rule is checked for self-escalation 1226, as the ability to prevent the security violation in real-time requires a data security enforcement point security node be in Active Mode 1228.

The escalation rule for alerting the security console that the escalation trigger event has occurred is now processed 1234. If the security node is currently not in Passive Mode 1236, i.e., it is in Active Mode, the security node performs it's specific application-layer security prevention function 1240—this may take the form of such preventative actions as denying data access, returning only encrypted data, returning only masked data, etc., for all data access requests or selectively by user name, user type, groups of users, etc., while in Active Mode. Operational Mode settings at the security node are checked to determine whether a violation alert should be sent 1250—if this security node is sending it's own violation alerts, that activity is performed 1252. Operational Mode settings at the security node are checked to determine whether logging should occur 1260—if this security node is performing it's own logging, that activity is performed 1262. Method 1200 ends at 1280.

Beginning at 1270, the security node receives an escalation trigger from the CPES, or a manual (de-)escalation command from the security console, at 1272 (distinct from data requests 1204). The new Operational Mode is set as the current mode, and the duration of escalation is set, according to the escalation trigger or override by the security console operator 1274—escalation duration is checked periodically at 1210 with a return to default Operational Mode when the duration has been exceeded. Operational Mode settings at the security node are checked to determine whether logging should occur 1260—if this security node is performing logging, that activity is performed 1262. Method 1200 ends at 1280.

Figure 13:
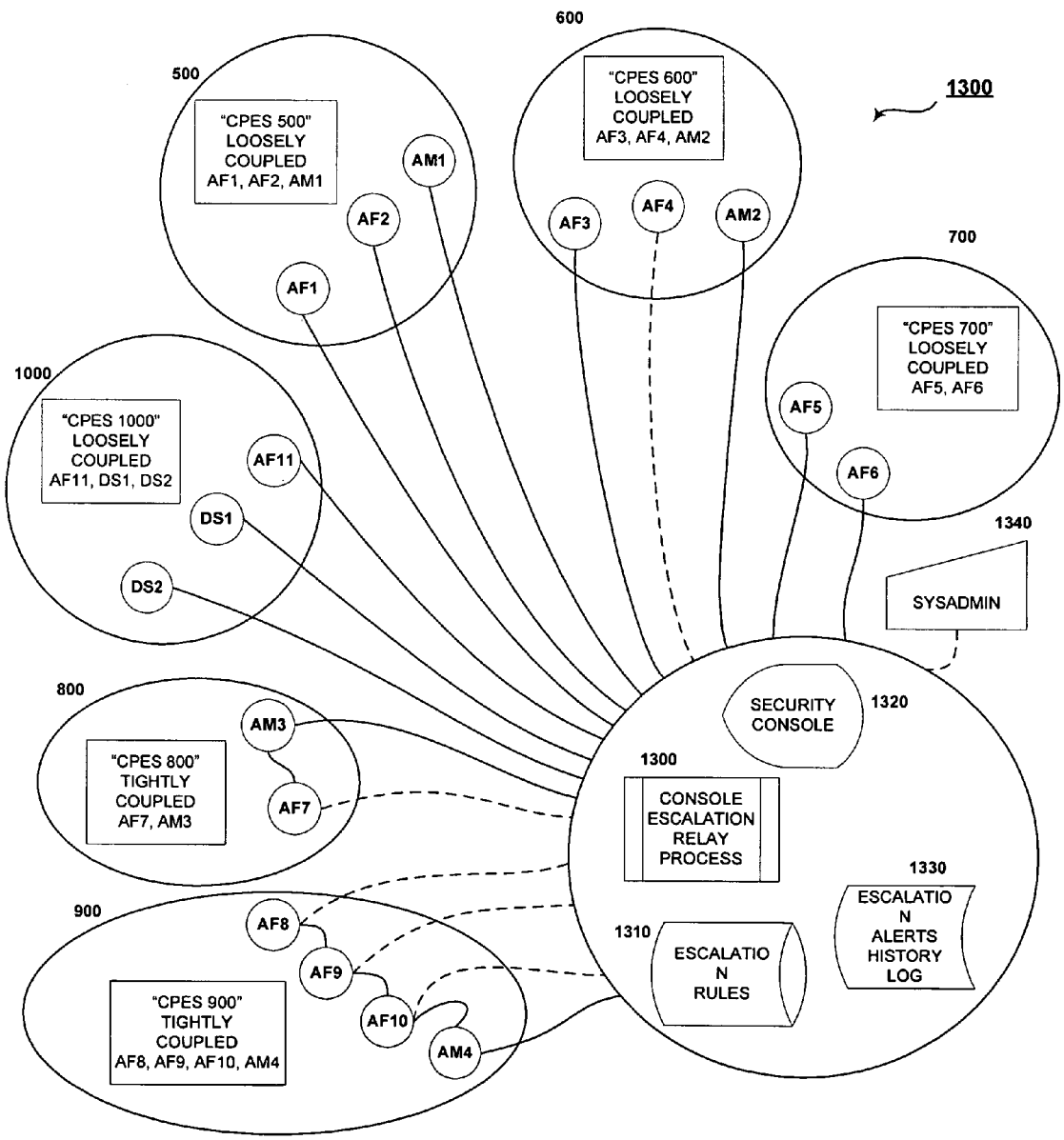
FIG. 13 illustrates an Escalation Alerts Relay system according to an embodiment of the invention.

FIG. 13 illustrates CPES 1300 escalation activation and de-activation according to an embodiment of the invention. Escalation triggers and alerts in system 1300 are relayed via both peer-to-peer and hub-and-spoke through a Security Console and application-layer security nodes, with targets either individually named or as identified by logical group names (e.g. "CPES 500" as shown in 500). Escalation is activated in real-time and near real-time across the CPES, as triggered by an initial escalation trigger event at a participating security node (from application firewall AF1, for example). Dotted lines in FIG. 13 indicate potential new sources of escalation trigger events once the initial escalation trigger has raised the Operational Mode from Bypass at those security nodes. De-escalation occurs at each security node once the escalation duration has been exceeded (without further escalation triggers which supersede the last prior escalation event) or by semi-automatic or manual override via the security console 1320 or sysadmin 1320.

Although the invention has been particularly shown and described with reference to several preferred embodiments thereof, it will be understood by those skilled in the art that various changes in form and details may be made therein without departing from the spirit and scope of the invention as defined in the appended claims.

We claim:

1. A cooperative processing and escalation method for application-layer security comprising the steps of:
    defining escalating operational modes at a plurality of receiving security nodes including standby, passive and active modes, and
    at a same single security node:
    identifying a security violation,
    matching said security violation to one or more escalation rule(s) of a pre-defined set of escalation rules, wherein said matched escalation rule(s) determine how said single security node responds to said security violation including whether to transmit or receive an escalation trigger or both,
    creating said escalation trigger associated with said matched escalation rule(s), wherein said escalation trigger instructs said plurality of receiving security nodes to activate one of said escalating operational modes, and
    transmitting said escalation trigger to said plurality of receiving security nodes.

2. The method of claim 1, further comprising the step of processing said escalation trigger at said receiving security node(s).

3. The method of claim 2, wherein said receiving security node processing includes processing an escalation trigger which supersedes a previously received escalation trigger.

4. The method of claim 2, wherein said receiving security node processing includes processing an escalation trigger and/or operational mode override received from a security console.

5. The method of claim 1, wherein said pre-defined set of escalation rules is created automatically.

6. The method of claim 1, wherein one or more such pre-defined escalation rules specifies a duration of time in which the escalation to a different operational mode is enforced, followed by an automatic reversion to the default or other operational mode at receiving security node(s).

7. The method of claim 1, wherein one or more such pre-defined escalation rules specifies an escalation to a different operational mode for a non-predetermined duration.

8. The method of claim 1, wherein said transmitting security node is also the receiving security node, otherwise known as self-escalation.

9. The method of claim 1, wherein said receiving security node is selected from the group consisting of: an application firewall, an application monitor, and a data security enforcement point.

10. The method of claim 1, wherein said receiving security nodes are defined as a logical or arbitrary grouping consisting of a plurality of one or more: application firewalls, application monitors, and/or data security enforcement points.

11. The method of claim 1, wherein said step of defining two or more operational modes comprises the step of defining bypass, passive and active operational modes.

12. The method of claim 11, wherein said passive and active operational modes includes sub-settings for transmitting logging and alerts associated with security violations and/or escalation triggers to a security console, log or repository.

13. The method of claim 11, wherein said active mode includes examining in-bound or out-bound application-layer traffic to detect escalation rule violations.

14. The method of claim 11, wherein said active mode includes examining data access requests and/or user data access behavioral patterns to detect escalation rule violations.

15. The method of claim 11, wherein said active mode includes blocking, redirecting, or correcting an in-bound or out-bound security violation.

16. The method of claim 11, wherein said active mode includes denying access, masking data, or denying data decryption for a data access request.

17. The method of claim 11, wherein said active mode includes receiving said escalation triggers.

18. The method of claim 11, wherein said passive mode includes examining in-bound or out-bound application-layer traffic to detect escalation rule violations.

19. The method of claim 11, wherein said passive mode includes examining data access requests and/or user data access behavioral patterns to detect escalation rule violations.

20. The method of claim 11, wherein said passive mode includes receiving said escalation triggers.

21. The method of claim 11, wherein said bypass mode includes receiving said escalation triggers.

22. The method of claim 1, wherein said step of identifying a security violation comprises the step of analyzing in-bound or out-bound application traffic at the application-layer according to a security policy.

23. The method of claim 22, wherein said in-bound and/or out-bound application traffic is transported via hypertext transport protocol (HTTP) or SSL-encrypted hypertext transport protocol (HTTPS).

24. The method of claim 1, wherein said step of identifying a security violation comprises the step of examining data access requests and/or user data access behavioral patterns according to a security policy.

25. The method of claim 1, wherein said transmitting security node is an application firewall, an application monitor, or a data security enforcement point.

26. The method of claim 1, wherein said transmitting security node is a network security device such as a network firewall, network router or other OSI layer 1-6 device or system.

27. The method of claim 1, wherein said transmission of an escalation alert is routed peer-to-peer between the transmitting security node and the receiving security node(s).

28. The method of claim 1, wherein said transmission of an escalation alert is routed from the transmitting security node to one or more hub-and-spoke network locations and thence forwarded to the receiving security node(s).

29. The method of claim 1, wherein said transmitting security node is an application monitor tightly coupled with one or more receiving application firewalls.

30. The method of claim 1, wherein said transmitting security node is an application firewall tightly coupled with a receiving application monitor.

31. A cooperative processing and escalation system for application-layer security comprising:

means for selectively configuring multiple network nodes to operate in two or more predetermined escalating operational modes including standby, passive and active modes, and a same single security node configured to:

identify a security violation;

match said security violation to one or more escalation rule(s) of a pre-defined set of escalation rules, wherein said escalation rule(s) determine how said security node is to respond to said security violation including whether to transmit or receive an escalation trigger or both, create said escalation trigger associated with said matched escalation rule(s), wherein said escalation trigger instructs said multiple network nodes to activate one of said predetermined escalating operational modes, and transmit said escalation trigger to said multiple network nodes to cause said multiple network nodes to operate in one of said two or more predetermined escalating operational modes in near-real time.

32. The cooperative processing and escalation system of claim 31, wherein said network nodes are selected from the group consisting of: one or more application-layer security nodes, one or more network-layer security nodes, and a combination thereof.

33. The cooperative processing and escalation system of claim 31, wherein said two or more predetermined operational modes include a bypass mode and a passive mode.

34. The cooperative processing and escalation system of claim 31, wherein said two or more predetermined operational modes include a passive mode and active mode.

35. The cooperative processing and escalation system of claim 31. wherein said two or more predetermined operational modes include a bypass mode and active mode.

* * * * *